(12) United States Patent
Fennel

(10) Patent No.: US 6,389,350 B1
(45) Date of Patent: May 14, 2002

(54) COMBINED SYSTEM FOR CONTROLLING THE HANDLING PERFORMANCE OF A MOTOR VEHICLE

(75) Inventor: Helmut Fennel, Bad Soden (DE)

(73) Assignee: Continental Teves AG & Co., OHG, Frankfurt (DE)

(*) Notice: Subject to any disclaimer, the term of this patent is extended or adjusted under 35 U.S.C. 154(b) by 0 days.

(21) Appl. No.: 09/555,675

(22) PCT Filed: Nov. 20, 1998

(86) PCT No.: PCT/JP98/07452

§ 371 Date: Aug. 25, 2000

§ 102(e) Date: Aug. 25, 2000

(87) PCT Pub. No.: WO99/29549

PCT Pub. Date: Jun. 17, 1999

(30) Foreign Application Priority Data

Dec. 5, 1997 (DE) .......................................... 197 53 907

(51) Int. Cl.[7] .............................................. B60R 16/02
(52) U.S. Cl. .......................... 701/91; 3/29; 3/31; 3/32; 3/33; 3/34; 395/183.09
(58) Field of Search ............................... 701/31, 34, 33, 701/29, 32, 35, 91; 395/183.09, 185.01, 183.04

(56) References Cited

U.S. PATENT DOCUMENTS 5,713,643 A * 2/1998 Esselbrugge et al. .. 303/122.08
5,957,985 A * 9/1999 Wong et al. ................. 701/33
5,987,365 A * 11/1999 Okamoto ..................... 701/29

FOREIGN PATENT DOCUMENTS

DE         44 39 060         5/1996

* cited by examiner

Primary Examiner—William A. Cuchlinski, Jr.
Assistant Examiner—Marthe Marc-Coleman
(74) Attorney, Agent, or Firm—Rader, Fishman & Grauer PLLC

(57) ABSTRACT

In a combined system for controlling the driving behavior of an automotive vehicle according to different control principles or control functions, such as Anti-lock Brake Systems, Traction Slip Control, Brake Force Distribution System, etc., which also comprises arrangements for monitoring the individual control functions and for modifying the control sequence or deactivation of individual functions upon the occurrence of defects, the individual control functions are ranked according to their necessity and their importance for the safety of the vehicle. The potential errors are also classified in a defined ranking and assigned to the control functions so that upon detection of an error or a source of error, only the control functions ranked below a defined safety level are maintained.

5 Claims, 2 Drawing Sheets

COMBINED SYSTEM FOR CONTROLLING THE HANDLING PERFORMANCE OF A MOTOR VEHICLE

TECHNICAL FIELD

The present invention relates to a combined system for controlling the driving behavior of an automotive vehicle.

BACKGROUND OF THE INVENTION

The development of automotive vehicle control systems utilize a plurality of different types of control principles or control functions. A prior art driving dynamics control (DDC, ASMS, ESP) e.g. comprises an anti-lock system (ABS), a traction slip control system (TSC), a yaw torque control system (YTC), and a brake force distribution control system (EBD). Several or all of these types of function make use of the same input signals. For example, all systems demand the measurement and evaluation of the rotational behavior of the individual wheels. Other signals are required only for some of the types of function. The same applies to the electronic system and actuator system; the electronic circuits, computer modules, monitoring circuits, etc., and also the electrically controllable hydraulic valves by which the braking pressure is modulated can be used in many applications in a system compound of this type. Therefore, it is advisable to realize such a combined system in an integrated construction for simplification and reduction in structure.

On the other hand, the combination of the types of function and the integration of the different elements and control systems suffers from the disadvantage that errors affect the overall system and, therefore, cause disconnection of the overall system and, hence, disabling of all control functions.

German patent application No. 44 39 060 discloses using a microprocessor arrangement in a complex vehicle control system which is composed of three single microprocessor systems among which the individual functions, e.g., ABS, TSC, EBD are shared. This is advantageous because the individual control systems are relatively independent of each other.

SUMMARY OF THE INVENTION

The present invention relates to a method for controlling driving behavior of an automotive vehicle which involves assigning error sources to individual control functions and then ranking the individual control functions according to importance to overall vehicle safety, followed by monitoring the error sources for an error signal, and finally fully or partially deactivating the control function assigned to the error source upon detection of the error signal from the error source while allowing the control functions which are ranked below the partially or fully deactivated control function to continue to operate.

An object of the present invention is to develop a combined system of the type mentioned hereinabove, wherein upon the occurrence of an error, only the part which is directly affected by the error or the control function which is directly impaired is disabled, on the one hand, wherein, however, because the control functions are mainly safety-critical, it is ensured, on the other hand, that the safety of the vehicle is maintained by safeguarding a defined part of the control functions.

The system of the present invention includes ranking individual control functions according to safety levels, i.e., according to their necessity and/or their importance for the safety of the vehicle, and classifying the potential sources of error, types of error, malfunctions, etc., according to their possible effects on the control functions and assigned to the control functions classified on the basis of the ranking in such a fashion that upon detection of an error, only those control functions can be maintained which are ranked below the safety level that is assigned to the error.

Consequently, the present invention is based on the premise that such an arrangement and assignment, wherein the various control functions are arranged on different safety levels according to their importance, and wherein the sources of error within the single categories are sorted according to their effect on the control functions, permits achieving a combined system which reacts optimally in every failure situation in a determined way whenever an error occurs, depending on the arrangement and assignment of this type of error to the control functions or the function level. All functions that are above the corresponding level will be disabled or switched over in every failure situation with a high degree of reliability, while all functions below the corresponding safety level are maintained to an unlimited or limited extent.

In a favorable embodiment of the present invention, the sources of error are determined and sorted according to different categories largely independent of each other, and are arranged so that the sources of error of each category, irrespective of the sources of error of the other categories, are assigned to the control functions so that upon the occurrence of an error, only those functions are maintained which are ranked below the safety level that is assigned to the corresponding error. As an example of such categories in which defined types of error or sources of error are comprised, e.g. the sensor system, the electronic system (including the electrical system and communication) and the actuator system or hydraulic system are referred to.

In the course of time, vehicle control systems or combined systems have become so complex that it is no longer appropriate to disable all control functions when an error occurs. The present invention is based on the consideration that a graded abandonment of the functions in dependence on the malfunction that appeared or is detected should be preferred. In a driving dynamics control system (DDC, ASMS) which comprises TSC, EBD as well as communication and diagnosis functions, the ranking which corresponds to safety levels and is advisable for a graded abandonment, could look as follows:

DETAILED DESCRIPTION OF THE PREFERRED EMBODIMENTS

Figure 1:
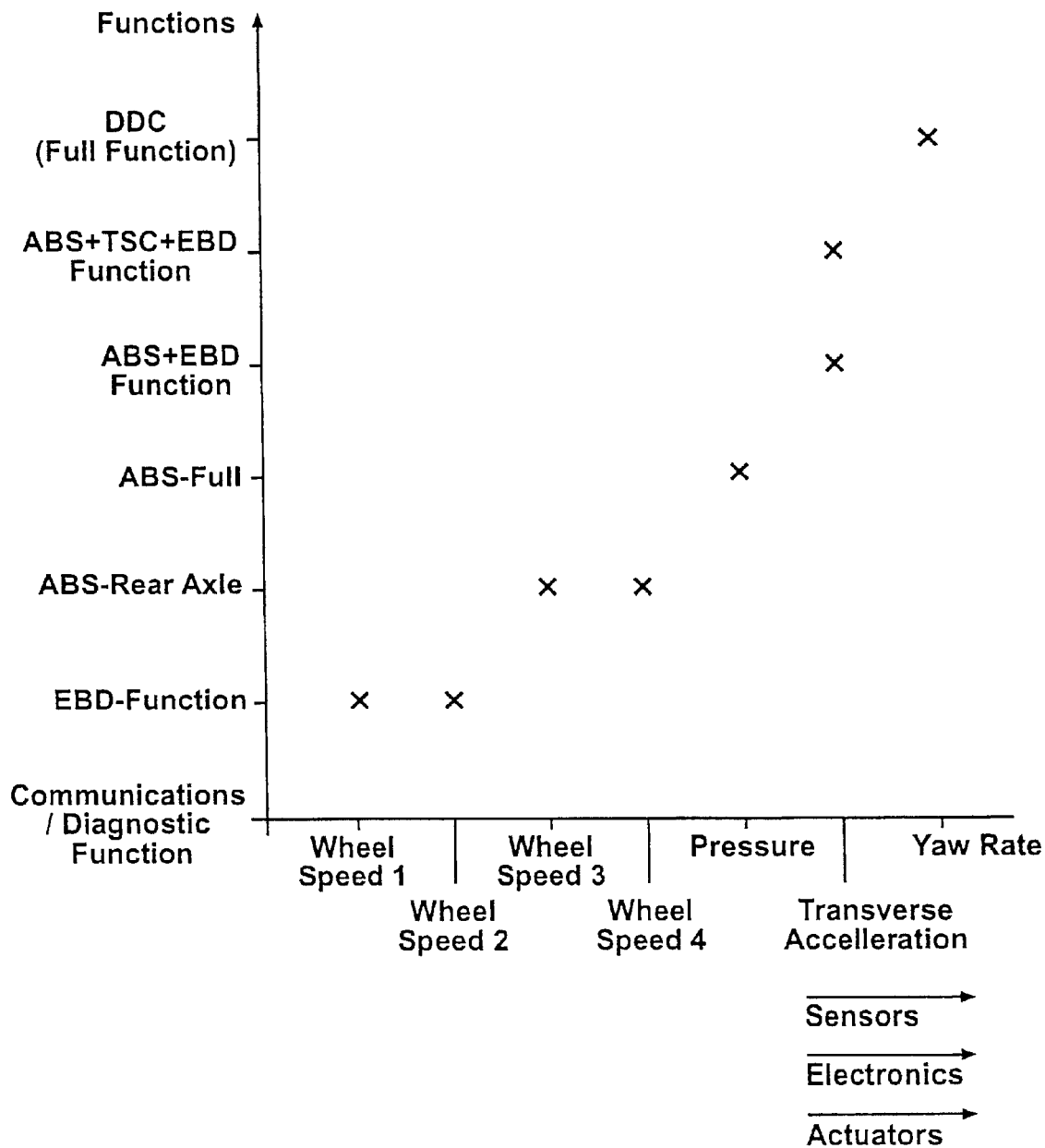
FIG. 1 is a two-dimensional diagram, illustrating the relationship between systems and functions.
Figure 2:
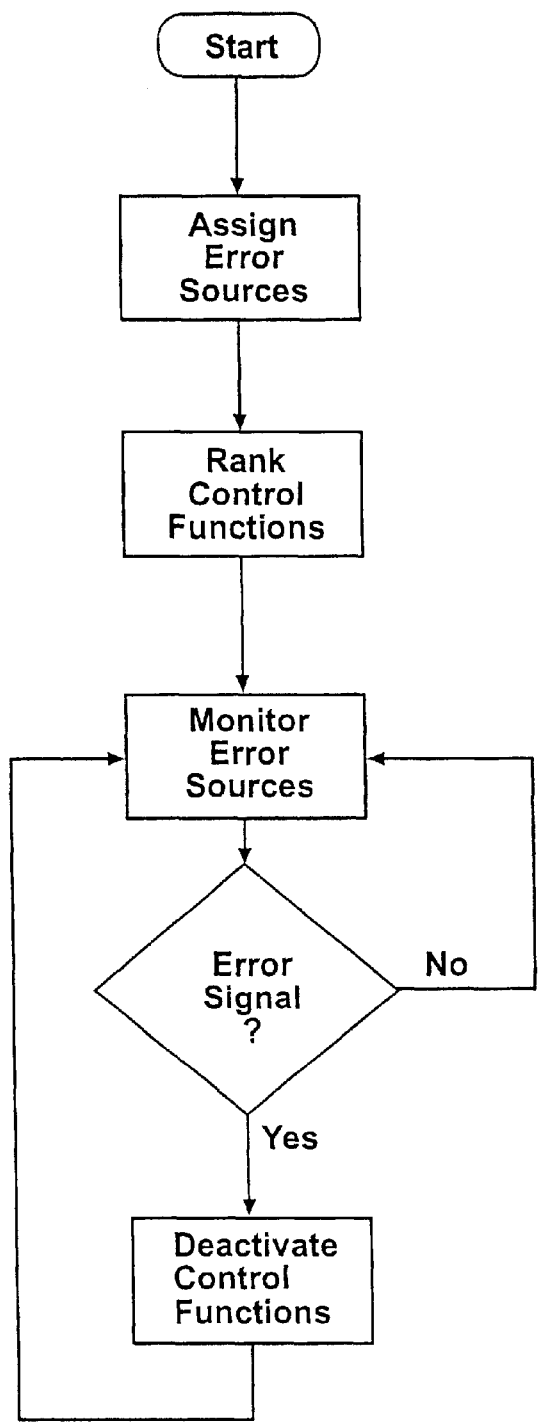
FIG. 2 is a flowchart detailing how the method of claim 10 is carried out.

Dependency or assignment of the individual safety levels or control functions of defined sensor errors, the above-mentioned abandonment stages of a combined system, e.g. an ASMS (driving dynamics control system) in the present case, are represented on the y axis in the above-mentioned order. The bottommost step (communication/diagnosis function) may be maintained practically at any error level or failure, while the overall function, that is the maximum or safety level, should remain operative only in the non-error condition. The other above-mentioned function or safety levels are disposed inbetween. In the embodiment shown herein, for example, at least the anti-lock control of the vehicle rear axle (rear-axle ABS) which is especially important for the driving stability of the vehicle may be maintained as long as the four wheel sensors are intact.

Types of error of the category "sensor system" are shown on the abscissa. The ranking represented herein which is, of course, only a special example of several possibilities, starts with the individual wheel sensors, further comprises a pressure sensor and a transverse acceleration sensor as well as a yaw velocity sensor which latter is required only for the overall function (ASMS) in this example.

Another category of this type is the electronic system of the combined control system, including the electrical system, the data bus, laced wiring harness, etc. These elements permit setting a similar sequence or ranking as in the illustrated category "sensor system", it being possible then to assign the safety levels which are classified from the overall function until down to the communication function to the individual elements.

For example, on such "two-dimensional" dependencies, as shown in the attached drawing for the category "sensor system", there may be superimposed corresponding two-dimensional dependencies (control functions in dependence on the electronic system, control functions in dependence on the actuator system) which are only indicated on the abscissa. A "safety block" is thereby developed from which can be taken which control functions or which safety level can still be maintained upon the occurrence of a defined error in the sensor system, electronic system or actuator system, or in the presence of a defined combination of errors.

It is then possible to design the combined system of the present invention on the basis of such a safety block in such a way that, in dependence on the predetermined or desired ranking of the potential errors, on the one hand, and the ranking of the control functions or the safety levels, on the other hand, depending on the type and importance of the respectively occurring error or the detected combination of errors, control functions that are still possible are maintained without impairing the safety of the vehicle, while other functions that are above the safety level are disabled to prevent the occurrence of critical, dangerous situations with a high degree of reliability.

The advantage of a safety model or safety block of this type involves that practically each failure situation may be represented as a function of the errors or combinations of errors that occurred. Thus, it may be determined with great reliability and accuracy which of the large number of control functions can actually be maintained and which functions must be disabled or limited to maintain the safety of the vehicle.

What is claimed is:

1. A method for controlling driving behavior of an automotive vehicle, comprising the steps of:

assigning error sources to individual control functions;

ranking the individual control functions according to importance to overall vehicle safety;

monitoring error sources for an error signal, and fully or partially deactivating the control function assigned to the error source upon detection of the error signal from the error source while allowing the control functions which are ranked below the partially or fully deactivated control function to continue to operate.

2. The method of claim 1, wherein the ranked control functions comprise driving dynamics control function, antilock brake system (ABS) plus traction slip control plus brake force distribution control (EBD) function, ABS+EBD function, full ABS function, rear axle ABS function, EBD function, and communications and diagnostic functions.

3. The method of claim 1, wherein the error sources comprise wheel speed sensors, brake pressure sensors, transverse acceleration sensors, yaw rate sensors, electrical system sensors, data bus sensors, wiring harness sensors, and hydraulic valve sensors.

4. The method of claim 1, wherein the assigning step further includes the step of sorting the error sources into at least three categories including a sensor system, an electronic system, and an actuator system.

5. A system for controlling driving behavior of an automotive vehicle comprising a microprocessor, wherein the microprocessor assigns error sources to individual control functions, ranks the individual control function according to importance to overall vehicle safety, monitors error sources for an error signal, and fully or partially deactivates the control function assigned to the error source upon detection of the error signal from the error source while allowing the control functions which are ranked below the deactivated control functions to continue to operate.

* * * * *